(No Model.)
V. P. TRAVERS.
ROPE BUCKLE.
No. 315,859. Patented Apr. 14, 1885.
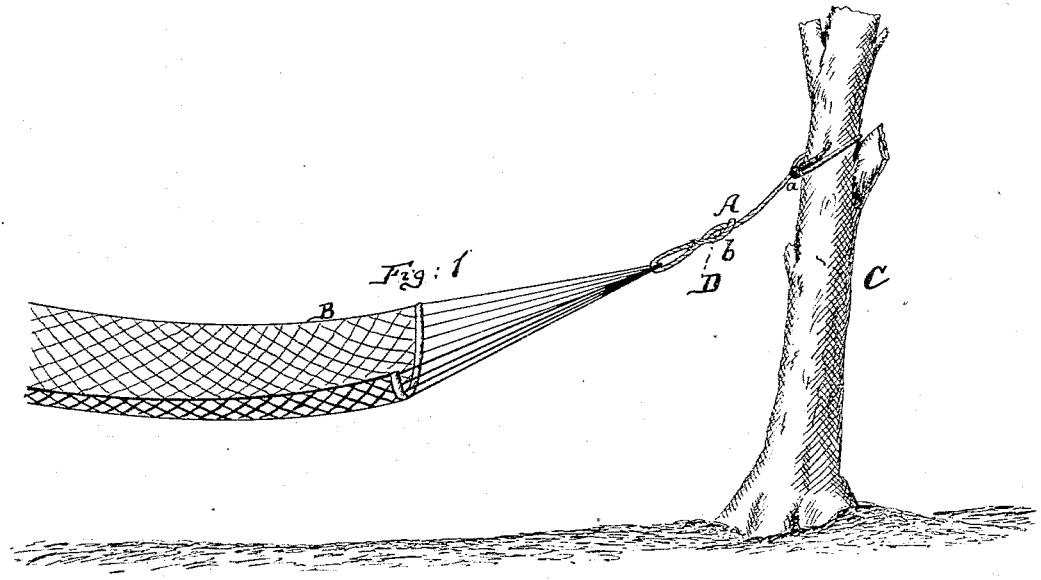
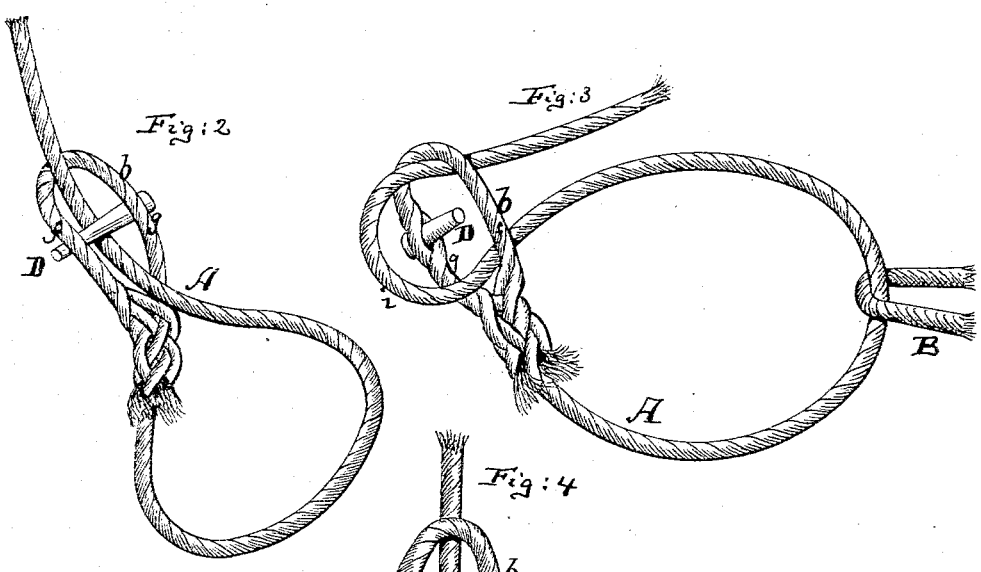
Witnesses:
John C. Tunbridge.
John M. Speer.
Inventor:
Vincent P. Travers
by his attorneys
Briesen & Steele

UNITED STATES PATENT OFFICE.

VINCENT P. TRAVERS, OF NEW YORK, N. Y.

ROPE-BUCKLE.

SPECIFICATION forming part of Letters Patent No. 315,859, dated April 14, 1885.

Application filed June 6, 1884. (No model.)

*To all whom it may concern:*

Be it known that I, VINCENT P. TRAVERS, a resident of New York city, in the county and State of New York, have invented an Improved Rope-Buckle, of which the following is a full, clear, and exact description, reference being made to the accompanying drawings, in which—

Figure 1 represents a side view of part of a hammock which is suspended by a rope having my improved buckle. Figs. 2, 3, and 4 are detail views of the rope-buckle, showing it in different positions.

This invention relates to a new attachment to ropes which are to be looped for holding articles under strain at greater or less distance from one another.

The invention consists in fitting a peg into a loop at the end of the rope, one end of said peg being loose, all as hereinafter more fully described.

In the drawings the invention is represented as applied to a hammock attachment; but it is applicable to all ropes, which are used in manner analogous to a hammock-suspension rope. The rope A, from which the hammock B is suspended, is tied to a tree or support, C, by suitable knot, *a*. The free end of the rope—that is, the end which hangs from the tree to receive the hammock—has a loop, *b*, formed on it, and into the strands which form the loop *b* is inserted a peg, D—that is to say, the peg D, which may be grooved at one end, as is indicated at *d* in Fig. 4, is grasped at this grooved portion by the strands of the rope which form one side, *g*, of the loop *b*. The peg D is of such length that it will extend across the loop, resting its free end *e* against the opposite strand, *f*, of said loop, as is clearly shown in Figs. 2 and 4.

In order to show how this invention is to be used, I will describe its application to a hammock-support. The rope A, being tied to the tree C by the knot *a*, has the loop *b* freely suspended from said tree. This loop *b* is then drawn through the end of the hammock so as to double the lower portion of the rope, and thereupon that part of the rope which now extends from the hammock to the tree is doubled, as shown at *i* in Fig. 3, and pushed through the loop *b* so as to get over the peg D, in manner shown in Fig. 4. When strain is now applied to the hammock by weighting it, it will be seen that the loop *b* with its peg will firmly bite the rope that lies on the peg and prevent the loop from slipping; yet whenever the strain is taken off the hammock the loop *b* can be pushed along the rope that extends from the hammock to the tree to adjust the hammock to any desired height. It will be seen that the peg D, being loose at one end, allows the doubled portion *i* of the rope to be pushed through the loop *b*, and then when it is pulled back said doubled portion will become straightened out, and will crowd the peg D against the side *f* of the loop *b*. I do not limit myself to the particular manner shown of securing the peg D to the side *g* of the loop. Other means of fastening it may be devised. Thus the peg may be perforated or have an eye through which the side *g* of the loop *b* can be inserted.

I claim—

1. The rope A, having loop *b*, combined with the peg D, one end of which is secured in one side, *g*, of said loop, while the other end of said peg is free to rest upon the opposite side, *f*, of the loop, substantially as herein shown and described.

2. The peg D, having grooved end *d*, combined with the loop *b* on the rope A, substantially as and for the purpose specified.

VINCENT P. TRAVERS.

Witnesses:
AUGUST SCHLARBAUM,
WILLY G. E. SCHULTZ.